E. T. GREENFIELD.
ELECTRIC MOTOR.
No. 517,858. Patented Apr. 10, 1894.
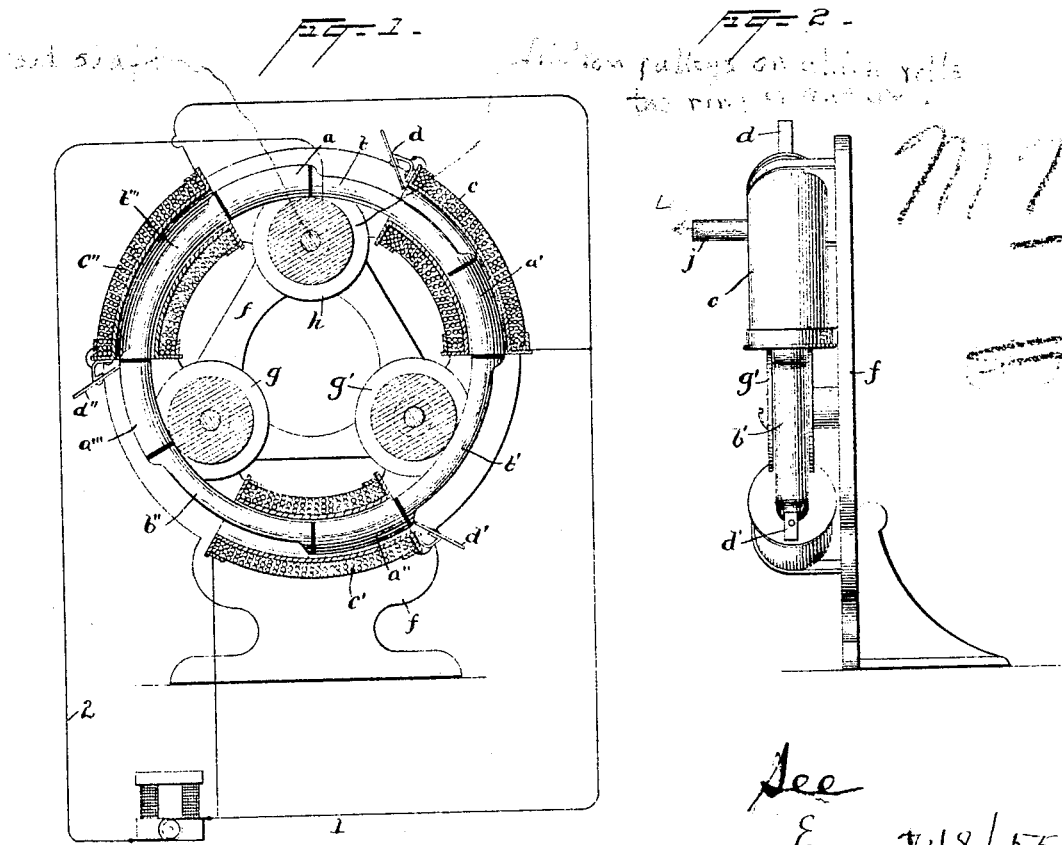
Witnesses
Norris A. Clark
N. F. Oberlin
Inventor
Edwin T. Greenfield
By his Attorneys

EDWIN T. GREENFIELD, OF NEW YORK, N. Y.

ELECTRIC MOTOR.

SPECIFICATION forming part of Letters Patent No. 517,858, dated April 10, 1894.

Application filed October 1, 1891. Serial No. 407,437. (No model.)

*To all whom it may concern:*

Be it known that I, EDWIN T. GREENFIELD, a citizen of the United States, residing at New York city, in the county and State of New York, have invented a certain new and useful Improvement in Electric Motors, of which the following is a specification.

The object of my invention is to produce an electric motor of small power for driving fans and other light machines which motor shall be of low cost, simple in construction, easily repaired and operated, and capable of operation with small amounts of current and on either an alternating or direct current circuit.

My invention consists in an electric motor having an annular armature or core made up of sections alternately of magnetic and non-magnetic materials; a series of solenoids surrounding said core connected with the circuit, brushes serving to close the circuit between said core and solenoids and power transmitting devices, such as friction wheels, driven by said core.

In the accompanying drawings forming part of this specification;—Figure 1 is a front elevation partly in section of a motor embodying my invention; and Fig. 2 is a side elevation of the same.

The annular core or armature of the motor is composed of alternate sections of magnetic and non-magnetic materials such as iron and brass. In the drawings $a$ $a'$ $a^2$ and $a^3$ are the magnetic sections and $b$, $b'$, $b^2$, $b^3$ are the non-magnetic sections. Preferably the armature is in solid ring form with the magnet sections laminated. The solenoids may be of any desired construction and in number equal to the amount of work required to be performed by a motor of given size. Three solenoids $c$ $c'$ and $c^2$ are shown in the drawings surrounding the core, both the interior and exterior thereof having a curvature coincident to that of the core. Preferably each solenoid carries a brush $d$ $d'$ and $d^2$, suitably mounted thereon and in connection with its coils, which brushes bear against the magnetic sections $a$, $a'$, &c., as they are successively brought into position.

A suitable stand $f$ is provided for the parts of the motor. Centering rollers $g$ and $g'$ and a friction and centering roller $h$ are mounted in said frame. Said rollers and frame are of conducting material and the friction roller $h$ carries the shaft or spindle $j$ upon which a fan may be mounted or the power otherwise transmitted.

The length of the magnetic sections of the core is so proportioned that a section thereof will just come into contact with one brush as the section just previously in contact pulls away from another brush and so that the portion in contact with a brush will also be in contact with the friction or other roller. Said magnetic sections are also so arranged in connection with the brushes that at all times at least one of the brushes is in contact with one of said sections.

In Fig. 1 the circuits are shown diagrammatically. 1 is the positive wire with which the solenoids are connected in multiple arc as shown; 2 is the negative wire which is connected with the stand $f$ or as shown with the roller $h$. Current flowing to the solenoids will find a path at the moment the circuit is closed by a brush being in or being brought into contact with a magnetic portion of the core. Thus energized the particular solenoid will exert a pull on the core and carry it forward until another brush makes electrical contact when the solenoid connected with the second brush will exert an additional pull and carry the core farther around until contact is again made between a brush and a magnetic section of the core. This being continued produces continuous rotation of the core which by friction or otherwise may be transmitted to the driven shaft.

I claim—

1. In an electric motor the combination with a series of solenoids of an annular core therefor made up of alternate sections of magnetic and non-magnetic material, a centering device for said core, a power transmitting device driven by said core, and brushes or contacts carried by said solenoids adapted to contact with said core, substantially as set forth.

2. In an electric motor the combination with an annular core made up of magnetic sections $a$, $a'$, &c., and non-magnetic sections $b$, $b'$, &c., of solenoids $c$, $c'$, &c., brushes $d$, $d'$, &c., of centering rollers $g$, $g'$ and centering and friction roller $h$, substantially as set forth.

This specification signed and witnessed this 10th day of September, 1891.

EDWIN T. GREENFIELD.

Witnesses:
J. A. YOUNG,
EUGENE CONRAN.